US012531508B2

(12) United States Patent
He

(10) Patent No.: US 12,531,508 B2
(45) Date of Patent: Jan. 20, 2026

(54) MULTI-CHANNEL TRANSVERSE COMBINED CONNECTOR FOR PHOTOVOLTAIC USE

(71) Applicant: Dongguan City Jianghan Electronics Co., Ltd, Dongguan (CN)

(72) Inventor: Tiejun He, Dongguan (CN)

(73) Assignee: Dongguan City Jianghan Electronics Co., Ltd., Dongguan (CN)

( * ) Notice: Subject to any disclaimer, the term of this patent is extended or adjusted under 35 U.S.C. 154(b) by 357 days.

(21) Appl. No.: 18/212,273

(22) Filed: Jun. 21, 2023

(65) Prior Publication Data

US 2024/0364259 A1 Oct. 31, 2024

(30) Foreign Application Priority Data

Apr. 25, 2023 (CN) ........................ 202310461393.5

(51) Int. Cl.

| | |
|---|---|
| ***H01R 13/58*** | (2006.01) |
| ***H01R 13/52*** | (2006.01) |
| ***H02S 40/34*** | (2014.01) |

(52) U.S. Cl.

CPC ......... *H02S 40/34* (2014.12); *H01R 13/5202* (2013.01); *H01R 13/5808* (2013.01)

(58) Field of Classification Search

CPC . H02S 40/34; H01R 13/5202; H01R 13/5808; H01R 31/02

See application file for complete search history.

(56) References Cited

U.S. PATENT DOCUMENTS 7,413,455 B2 * 8/2008 Hughes .................. H01R 13/53 439/187
7,501,598 B2 * 3/2009 Stepniak ............ H01H 33/6606 218/120
7,892,036 B2 * 2/2011 Lee ........................ H01R 31/02 439/638
7,972,155 B1 * 7/2011 Siebens .................. H01R 13/53 439/181
8,003,888 B2 * 8/2011 Owen, Sr. .............. H02G 15/08 174/72 A
9,112,322 B2 * 8/2015 Siebens .................. H01R 13/17

(Continued)

FOREIGN PATENT DOCUMENTS

CN 105514674 A 4/2016
CN 216289088 U 4/2022

(Continued)

*Primary Examiner* — Thanh Tam T Le

(74) *Attorney, Agent, or Firm* — Birchwood IP

(57) ABSTRACT

The present disclosure discloses a multi-channel transverse combined connector for photovoltaic use, which comprise a main connecting member provided on one side, a rear connecting member provided on the other side, and a plurality of intermediate connecting members provided in the middle; wherein an upper end of the main connecting member is provided with an input connecting end for connecting input, a lower end thereof is provided with a first output connecting end for outputting, and a side end thereof is provided with a first transverse output end for outputting. The connector of the present disclosure can be transversely expanded as required, so that the integration degree of the connector is improved and the cost is reduced, thereby being beneficial to large-scale application.

14 Claims, 9 Drawing Sheets

(56) References Cited

U.S. PATENT DOCUMENTS

| | | | | |
|---|---|---|---|---|
| 9,124,050 | B2 * | 9/2015 | Siebens | H01R 13/207 |
| 9,350,103 | B2 * | 5/2016 | Siebens | H01R 24/20 |
| 9,385,493 | B2 * | 7/2016 | Maroney | H01R 4/50 |
| 9,437,374 | B2 * | 9/2016 | Siebens | H01H 9/12 |
| 9,660,402 | B2 * | 5/2017 | Maroney | H01R 25/162 |
| 9,728,307 | B2 * | 8/2017 | Luzzi | H01C 7/12 |
| 9,774,179 | B1 * | 9/2017 | Marcath | H02G 15/10 |
| 9,887,504 | B1 * | 2/2018 | Luo | H01R 24/60 |
| 9,954,315 | B2 * | 4/2018 | Siebens | H01R 13/53 |
| 10,938,170 | B1 * | 3/2021 | Chen | H01R 25/003 |
| 11,111,935 | B2 * | 9/2021 | Biwersi | F15B 13/0867 |
| 11,658,467 | B2 * | 5/2023 | Yamada | H02B 13/02<br>361/624 |
| 11,817,234 | B2 * | 11/2023 | Kumar | H01R 31/02 |
| 11,909,151 | B2 * | 2/2024 | Endo | H01R 9/0518 |
| 12,237,630 | B2 * | 2/2025 | Zucca | H01R 25/003 |
| 12,355,174 | B2 * | 7/2025 | Mettavant | H01R 13/20 |

FOREIGN PATENT DOCUMENTS

| | | | |
|---|---|---|---|
| CN | 204732641 | U | 10/2025 |
| JP | 2000348836 | A | 12/2020 |

* cited by examiner

MULTI-CHANNEL TRANSVERSE COMBINED CONNECTOR FOR PHOTOVOLTAIC USE

CROSS-REFERENCE TO RELATED APPLICATIONS

This application claims the benefit and priority of Chinese patent application No. 202310461393.5, filed on Apr. 25, 2023, disclosure of which is hereby incorporated by reference in its entirety.

TECHNICAL FIELD

The present disclosure relate to the technical field of photovoltaic connectors, in particular to a multi-channel transverse combined connector for photovoltaic use.

BACKGROUND

Because photovoltaic systems are exposed to wind and rain, scorching sun and extreme temperature changes for a long time, connectors must be able to adapt to these harsh environments. The connectors should not only be waterproof, high temperature resistant and weather resistant to ultraviolet rays, but also have touch protection, high current-carrying capacity and high efficiency. At the same time, low contact resistance is also an important consideration. After a photovoltaic connector is put on the market, it is quickly recognized by the market and gradually becomes the standard of photovoltaic connectors. Standard connectors are required for the interconnection of photovoltaic modules or the connection between photovoltaic modules and other devices such as inverters.

The existing T-joint makes the connection tight and reliable by means of threads and buckles, which can meet the situation of one-to-two connection or even one-to-many connection. However, the existing T-joint but also has the following defects: the connector can only meet the situation of multi-channel output in a fixed situation. When multi-channel splicing is needed temporarily, connectors can only be used for splicing one by one, and a connection port is added for splicing every connector, which leads to the need of a large number of connectors, so that the integration degree at the joint is not high, and the wiring harness needs to be sorted out. At the same time, the splicing cost is also high, which is not conducive to large-scale installation.

SUMMARY

The present disclosure aims to solve the defects in the prior art that connectors cannot be combined temporarily as required, and the integration degree at the joint is low and the cost is high, and provides a multi-channel transverse combined connector for photovoltaic use.

In order to achieve the above purpose, the present disclosure provides a multi-channel transverse combined connector for photovoltaic use, comprising a main connecting member provided on one side, a rear connecting member provided on the other side, and a plurality of intermediate connecting members provided in the middle; wherein an upper end of the main connecting member is provided with an input connecting end for connecting input, a lower end thereof is provided with a first output connecting end for outputting, and a side end thereof is provided with a first transverse output end for outputting; one side of the intermediate connecting member is provided with a first transverse input end for connecting the first transverse output end, the other side thereof is provided with a second transverse output end for outputting, and a lower end thereof is provided with a second output connecting end for outputting; a side end of the rear connecting member is provided with a second transverse input end for connecting the second transverse output end, and a lower end thereof is provided with a third output connecting end for outputting.

Preferably, male terminals are provided inside the first output connecting end, the second output connecting end, the third output connecting end and the second transverse input end, the male terminals comprise a second contact, a second base and a second connecting member connected in sequence; the second contact is provided with a second circular plug at one end far away from the second base, the second circular plug is provided with a plurality of second elastic sheets which are in close contact with an inserted part; the second elastic sheet has certain elasticity and expands outward under the action of elastic force, so that the outer surface of the second elastic sheet is in contact with the inner surface of the first contact, and at the same time, under the action of elastic force, the outer surface of the second elastic sheet is in elastic close contact with the inner surface of the first contact.

Preferably, an end of the second elastic sheets is further provided with at least one convex body; the convex body protrudes from the outer surface of the second elastic sheet, so that the convex body can be in closer contact with the inner surface of the first contact, and the contact is better.

Preferably, the second contact, the second base and the second connecting member are integrally formed; and parts of the male terminal are reduced, which is convenient for workers to install.

Preferably, a second clamping ring is provided on the second base, a second circular groove is provided on the second base, the second clamping ring is sleeved inside the second circular groove, and the outer surface of the second clamping ring is uniformly provided with second clamping members to be clamped inside a housing.

Preferably, one end of the second clamping member is connected with the outer surface of the second clamping ring, and the cross-sectional area of the other end in the direction from the second clamping ring to the second connecting member is gradually increased; the second clamping member can clamp the male terminal inside the external housing, which is convenient for workers to install and fix the male terminal with the housing.

Preferably, a female terminal is provided inside the input connecting end; the female terminal and the male terminal are used in pairs, the male terminal is inserted into the female terminal; the female terminal comprises a first contact, a first base and a first connecting member which are connected in sequence; and the first contact, the first base and the first connecting member are connected in sequence and are integrally formed, so that parts of the female terminal are reduced, which is convenient for workers to install.

Preferably, the first contact is provided with a plurality of first elastic sheets; one end of the first elastic sheet is connected with the end of the first contact, and the other end thereof is connected with the first base; when the second contact is inserted into the first contact, the inner side of the first elastic sheet is in close contact with the outer surface of the second elastic sheet, and the elastic deformation force is used for pressing and close contact.

Preferably, an inward concave inner wall of the first elastic sheet forms an elastic contact area, and the elastic contact area is a plane concave structure; further, when the second contact is inserted into the first contact, the convex body abuts against the inner wall on the right side of the elastic contact area, which also makes the convex body cling to the inner wall of the elastic contact area by using elastic force.

Preferably, the first contact and the first base are further provided with first circular grooves, a first clamping ring is sleeved on the first circular groove, and the outer surface of the first clamping ring is uniformly provided with first clamping members to be clamped inside a housing; and the first clamping member can clamp the female terminal inside the external housing, which is convenient for workers to install.

Preferably, one end of the first clamping member is connected with the outer surface of the first clamping ring, and the cross-sectional area of the other end in the direction from the first clamping ring to the first connecting member gradually increases.

Preferably, the main connecting member comprises a first housing provided outside, an upper end inside the first housing is provided with a female terminal, a lower part thereof is provided with a male terminal, and a middle part thereof is provided with a first T-shaped connecting member, the female terminal, the male terminal and the first T-shaped connecting member are connected by a first copper rod, the first T-shaped connecting member is provided with an upper connecting end, a lower connecting end and a transverse connecting end; an upper part of the first copper rod is fixedly connected with the first connecting member, a lower part thereof is fixedly connected with the second connecting member, and a middle part thereof penetrates through the upper connecting end and the lower connecting end; and the female terminal, the male terminal and the first T-shaped connecting member are tightly surrounded around the first copper rod to realize electrical connection.

Preferably, a plurality of ribs for fixing the first copper rod are provided inside the first connecting member and the second connecting member; the upper connecting end and the lower connecting end are both arc-shaped to tightly wrap the first copper rod; and the sides of the upper connecting end and the lower connecting end are provided with a plurality of circular are sheets for wrapping the first copper rod; the plurality of ribs are provided side by side, so that the friction force is increased, and the connection is more reliable and tight; the addition of a circular are sheet is beneficial to fixing the first copper rod, so that it is not easy for the first T-shaped connecting member to deviate.

Preferably, the transverse connecting end is provided with a third circular groove, a plurality of first elastic sheets are provided in the third circular groove; an inward concave inner wall of the first elastic sheet forms an elastic contact area, the elastic contact area is a plane concave structure; and a third clamping ring is sleeved on the third circular groove; and the elastic contact area in the transverse connecting end squeezes the first circular plug, so that the first elastic sheet is in close contact with the first circular plug.

Preferably, the intermediate connecting member comprises a second housing provided outside, an upper end inside the second housing is provided with a second T-shaped connecting member, a lower part thereof is provided with a male terminal, the second T-shaped connecting member and the male terminal are connected by a second copper rod, one end of the second T-shaped connecting member is provided with a first circular plug to be inserted into the transverse connecting end, the other end thereof is provided with the transverse connecting end, a lower end thereof is provided with a lower connecting end, an upper part of the second copper rod is fixedly connected with the lower connecting end, and the lower part thereof is connected with the second connecting member; the intermediate connecting member is used as an intermediate connecting member, and when a plurality of intermediate connecting members are connected, the first circular plug of one intermediate connecting member is inserted into the transverse connecting end of another intermediate connecting member, thereby realizing transverse splicing and adding a plurality of second output connecting ends.

Preferably, the rear connecting member comprises a third housing provided outside, a side end inside the third housing is provided with a male terminal to be inserted into the transverse connecting end, a lower part thereof is further provided with a male terminal, two male terminals are connected by a third copper rod, and both ends of the third copper rod is fixedly connected with the second connecting member.

Preferably, both the first transverse output end and the second transverse output end are provided with waterproof grooves, an annular waterproof ring is sleeved on the waterproof groove; and the annular waterproof ring is provided inside the waterproof groove, so that the joint has good waterproof performance.

Preferably, the annular waterproof ring has a double-peak structure, so that the combined connectors have good waterproof performance.

Preferably, hooks are provided on both sides of the first transverse output end and the second transverse output end, the cross section of the hooks is conical, two symmetrical clamping grooves are provided on both sides of the first transverse input end and the second transverse input end, and the size of the clamping groove is matched with the size of the hook.

Compared with the prior art, the present disclosure has the following beneficial effects.

According to the present disclosure, a plurality of intermediate connecting members are transversely provided between the main connecting member and the rear connecting member. The connector can be transversely expanded as required by increasing the number of intermediate connecting members, wherein the intermediate connecting members are provided with a first transverse input end, a second transverse output end and a second output connecting end, respectively. The first transverse input end is connected with the first transverse output end of the main connecting member, and the second transverse output end is connected with the second transverse input end of the rear connecting member. As an added output port, the second output connecting end realizes transverse expansion, uses an internal connection mode, and improves the integration degree of the connector. The connector of the present disclosure can be transversely expanded only by adding an intermediate connecting member between the main connecting member and the rear connecting member, so that the connection cost is greatly reduced, thereby being beneficial to large-scale application.

BRIEF DESCRIPTION OF DRAWINGS

In order to explain the embodiments of the present disclosure or the technical schemes in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without any creative effort.

In the figures, there are.

1. Main connecting member; 2. Intermediate connecting member; 3. Rear connecting member; 11. Input connecting end; 12. First output connecting end; 13. First transverse output end; 21. First transverse input end; 22. Second transverse output end; 23. Second output connecting end; 31. Second transverse input end; 32. Third output connecting end; 42. Male terminal; 421. Second contact; 422. Second base; 423. Second connecting member; 4211. Second circular plug; 4212. Second elastic sheet; 4213. Convex body; 4221. Second clamping ring; 4222. Second circular groove; 4223. Second clamping member; 52. Female terminal; 521. First contact; 522. First base; 523. First connecting member; 5212. First elastic sheet; 5213. Elastic contact area; 5211. First circular groove; 5221. First clamping ring; 5222. First clamping member; 14. First housing; 15. First T-shaped connecting member; 16. First copper rod; 151. Upper connecting end; 152. Lower connecting end; 153. Transverse connecting end; 17. Rib; 18. Circular are sheet; 1531. Third circular groove; 1532. Third clamping ring; 24. Second housing; 25. Second T-shaped connecting member; 251. First circular plug; 26. Second copper rod; 34. Third housing; 36. Third copper rod; 115. Waterproof groove; 116. Annular waterproof ring; 19, Hook; 20. Clamping groove.

DETAILED DESCRIPTION

The technical scheme in the embodiment of the present disclosure will be clearly and completely described hereinafter with reference to the attached drawings. Obviously, the described embodiment is one embodiment of the present disclosure, rather than all of the embodiments. Based on this embodiment of the present disclosure, all other embodiments obtained by those skilled in the art without any creative effort belong to the scope of protection of the present disclosure.

As shown in FIGS. 1 to 9, the present disclosure provides a multi-channel transverse combined connector for photovoltaic use.

Figure 1:
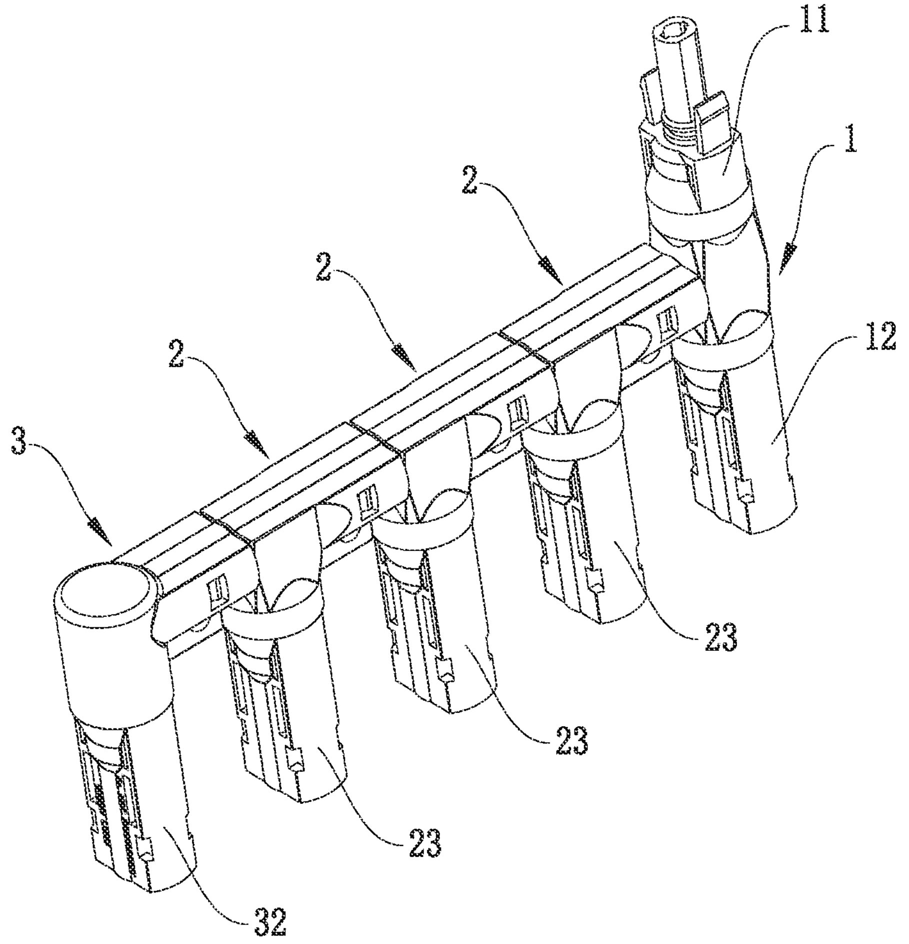
FIG. 1 is a schematic structural diagram of a five-channel transverse combined connector according to the present disclosure.

As shown in FIG. 1, FIG. 1 shows a five-channel transverse combined connector according to the present disclosure. The combined connector comprises a main connecting member 1 provided on the right side, a rear connecting member 3 provided on the left side and three intermediate connecting members 2 provided in the middle.

Figure 3:
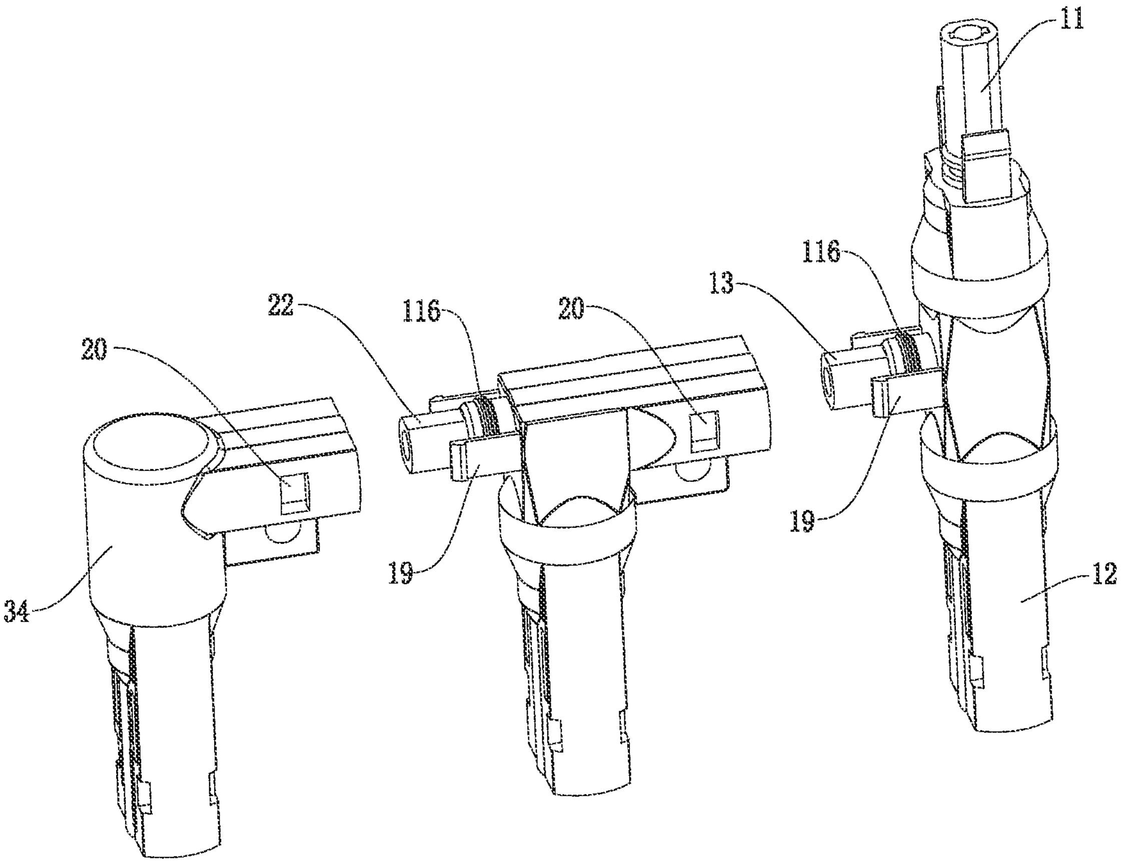
FIG. 3 is an exploded schematic diagram of a three-channel transverse combined connector according to the present disclosure.

As shown in FIG. 3, FIG. 3 shows a three-channel transverse combined connector according to the present disclosure. The combined connector comprises a main connecting member 1 provided on the right side, a rear connecting member 3 provided on the left side and an intermediate connecting member 2 provided in the middle.

It can be seen that in this embodiment, the number of channels is changed by changing the number of intermediate connecting members 2 provided transversely. When two channels need to be formed, the intermediate connecting members 2 are not used directly, so that the number of intermediate connecting members 2 is zero. When three channels need to be formed, an intermediate connecting member 2 is used. When four channels need to be formed, two intermediate connecting members 2 are used, and so on. In this embodiment, the number of intermediate connecting members 2 is reduced or increased, so that the connectors can be expanded transversely as required, thus facilitating expansion.

Figure 2:
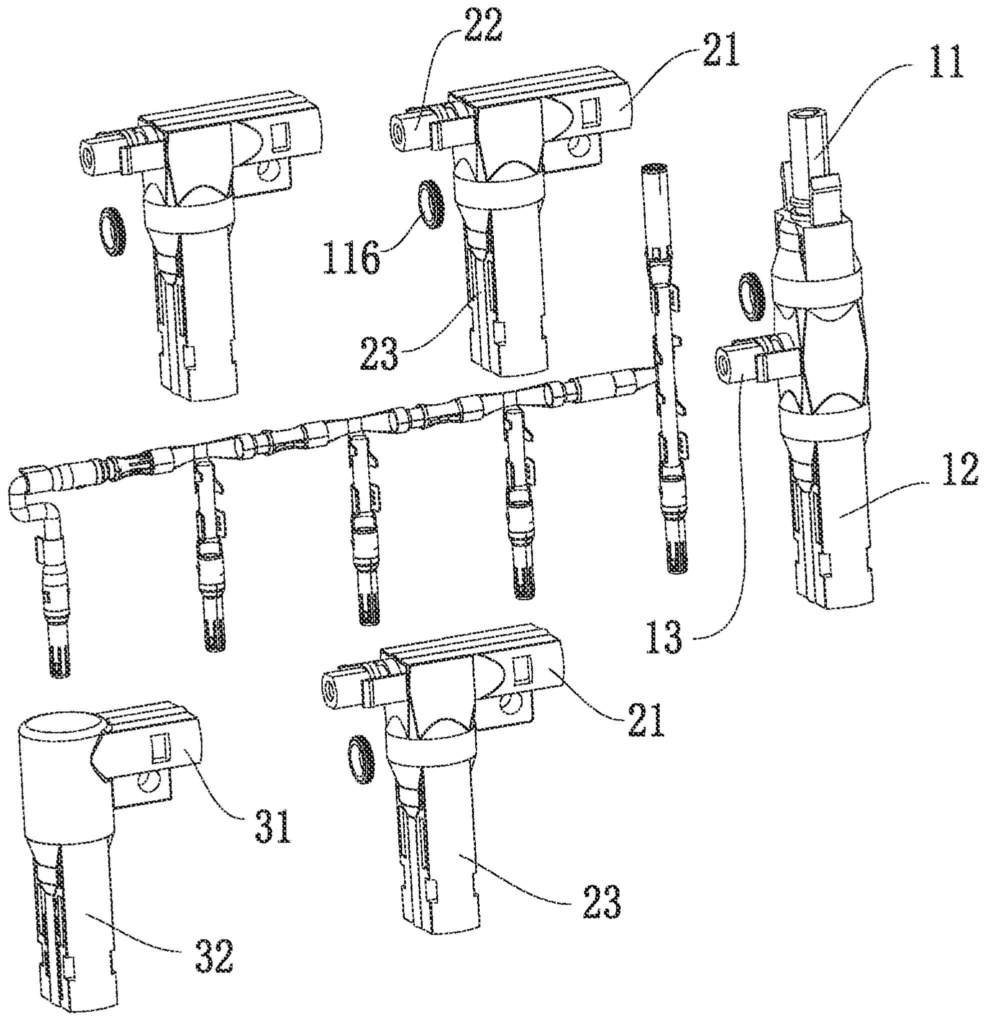
FIG. 2 is an exploded schematic diagram of a five-channel transverse combined connector according to the present disclosure.

The basic principle of this embodiment has been clearly introduced hereinabove. With reference to FIG. 2, various components and interfaces of components will be described in detail hereinafter. The upper end of the main connecting member 1 is provided with an input connecting end 11. The input connecting end 11 is used to connect input ports to realize the input of power or signals. The lower end of the main connecting member 1 is provided with a first output connecting end 12. The first output connecting end 12 is used as a first output port to output power or signals. The left side of the main connecting member 1 is provided with a first transverse output end 13. The first transverse output end 13 is used as an output port of the side for outputting power or signals from the side and inputting power or signals into the intermediate connecting member 2.

Further, the right side of the intermediate connecting member 2 is provided with a first transverse input end 21. The first transverse input end 21 is butted with the first transverse output end 13. Specifically, the first transverse output end 13 is inserted into the first transverse input end 21, so as to input power or signals into the intermediate connecting member 2. The lower end of the intermediate connecting member 2 is provided with a second output connecting end 23. The second output connecting end 23 is used as the second or N-th output port to output power or signals. The left side of the intermediate connecting member 2 is provided with a second transverse output end 22. The second transverse output end 22 is used as an output port of the side for outputting power or signals from the side and inputting power or signals into another intermediate connecting member 2 or the rear connecting member 3.

Still further, the right side of the rear connecting member 3 is provided with a second transverse input end 31. The second transverse input end 31 is butted with the second transverse output end 22. Specifically, the second transverse output end 22 is inserted into the second transverse input end 31, so as to input power or signals into the rear connecting member 3. The lower end of the rear connecting member 3 is provided with a third output connecting end 32. The third output connecting end 32 is used as the last output port on the left side and outputs power or signals.

Figure 4:
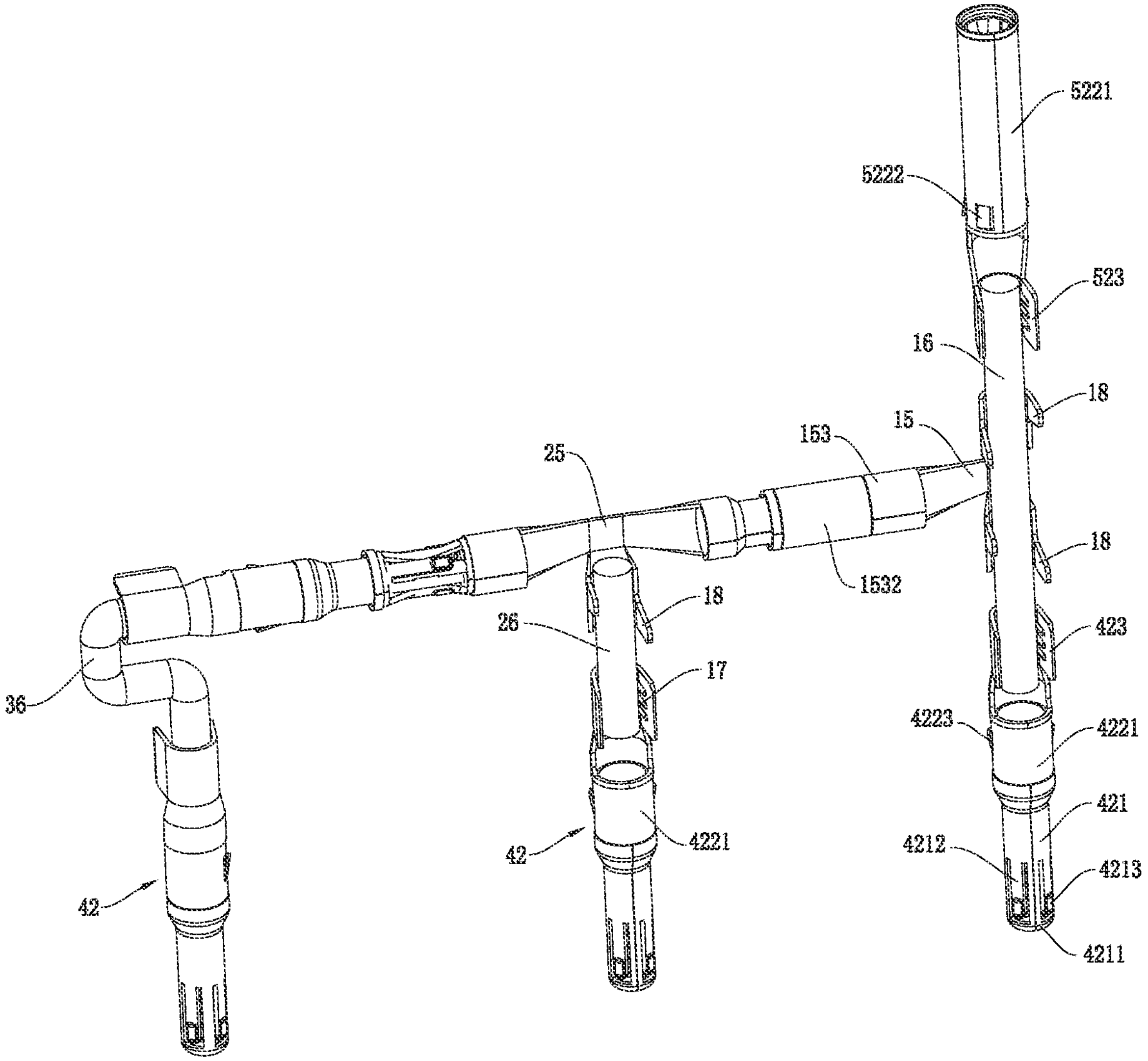
FIG. 4 is a schematic diagram of an internal structure of a three-channel transverse combined connector according to the present disclosure.
Figure 8:
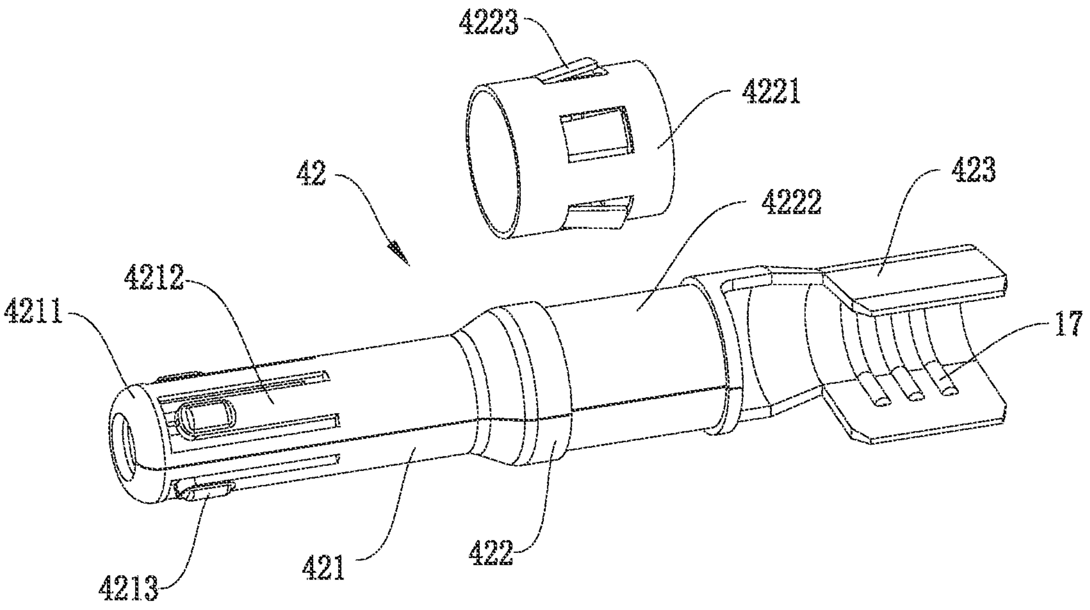
FIG. 8 is an exploded schematic diagram of a male terminal according to the present disclosure.

As shown in FIG. 4, all of the first output connecting end 12, the second output connecting end 23, the third output connecting end 32 and the second transverse input end 31 are provided with male terminals 42, and use the male terminals 42 as input or output interface connecting members. Further, as shown in FIG. 8, the male terminal 42 comprises a second contact 421, a second base 422 and a second connecting member 423 connected in sequence. As shown in FIG. 4, the second contact 421, the second base 422 and the second connecting member 423 are connected in sequence from left to right, and the second base 422 is provided between the second contact 421 and the second connecting member 423.

When in use, it is necessary to insert the second contact 421 into the first contact 521 of the female terminal 52, so that in this embodiment, the second contact 421 is provided with a second circular plug 4211 at the end far away from the second base 422. The second circular plug 4211 is provided with a plurality of second elastic sheets 4212 that are in close contact with the inserted parts. The second elastic sheet 4212 has certain elasticity and expands outward under the action of elastic force, so that the outer surface of the second elastic sheet 4212 is in contact with the inner surface of the first contact 521, and at the same time, under the action of elastic force, the outer surface of the second elastic sheet 4212 is in elastic close contact with the inner surface of the first contact 521.

In order to further strengthen the above close connection, in this embodiment, at least one convex body 4213 is provided at the end of the second elastic sheet 4212, and the convex body 4213 is a convex hull. In other embodiments, the convex body 4213 can also be provided as a lug, which is not limited thereto. The convex body 4213 protrudes from the outer surface of the second elastic sheet 4212, so that the convex body 4213 can be in closer contact with the inner surface of the first contact 521, and the contact is better. Still further, the outer surface of the convex body 4213 is further provided with an arc chamfer, which can facilitate the insertion and extraction of the second circular plug 4211.

In this embodiment, the second contact 421, the second base 422 and the second connecting member 423 are all made of metal materials, preferably copper materials with good conductivity. The second contact 421, the second base 422 and the second connecting member 423 are integrally formed, and parts of the male terminal 42 are reduced, which is convenient for workers to install.

In other embodiments, the second contact 421, the second base 422 and the second connecting member 423 can be manufactured separately, and then they can be fixedly connected together by welding, bolts or other fixed connection methods.

The above structure has solved the problems of connection between the second contact 421 and the first contact 521 and close connection. Next, it is necessary to fix the male terminal 42 inside the housing so that the male terminal 42 is fixed with the housing. As shown in FIG. 8, the second base 422 is provided with a second clamping ring 4221. Specifically, the second base 422 is provided with a second circular groove 4222. The second clamping ring 4221 is sleeved inside the second circular groove 4222 and is limited by protrusions at both ends, so that the second clamping ring 4221 is fixedly sleeved on the second base 422. Further, the outer surface of the second clamping ring 4221 is uniformly provided with second clamping members 4223 to be clamped inside the housing. The second clamping member 4223 can clamp the male terminal 42 in the external housing (for example, the first housing 14, the second housing 24 or the third housing 34), which is convenient for workers to install and fix the male terminal 42 with the housing.

Furthermore, in this embodiment, one end of the second clamping member 4223 is connected with the outer surface of the second clamping ring 4221, and the cross-sectional area of the other end in the direction from the second clamping ring 4221 to the second connecting member 423 gradually increases. In other embodiments, one end of the second clamping member 4223 is connected with the outer surface of the second clamping ring 4221, and the end far away from the second clamping ring 4221 slightly expands outward, which is not limited thereto. The direction in which the cross-sectional area increases and the direction in which the cross-sectional area slightly expands outward may be opposite to the above description, as long as the fixed function is realized.

Figure 5:
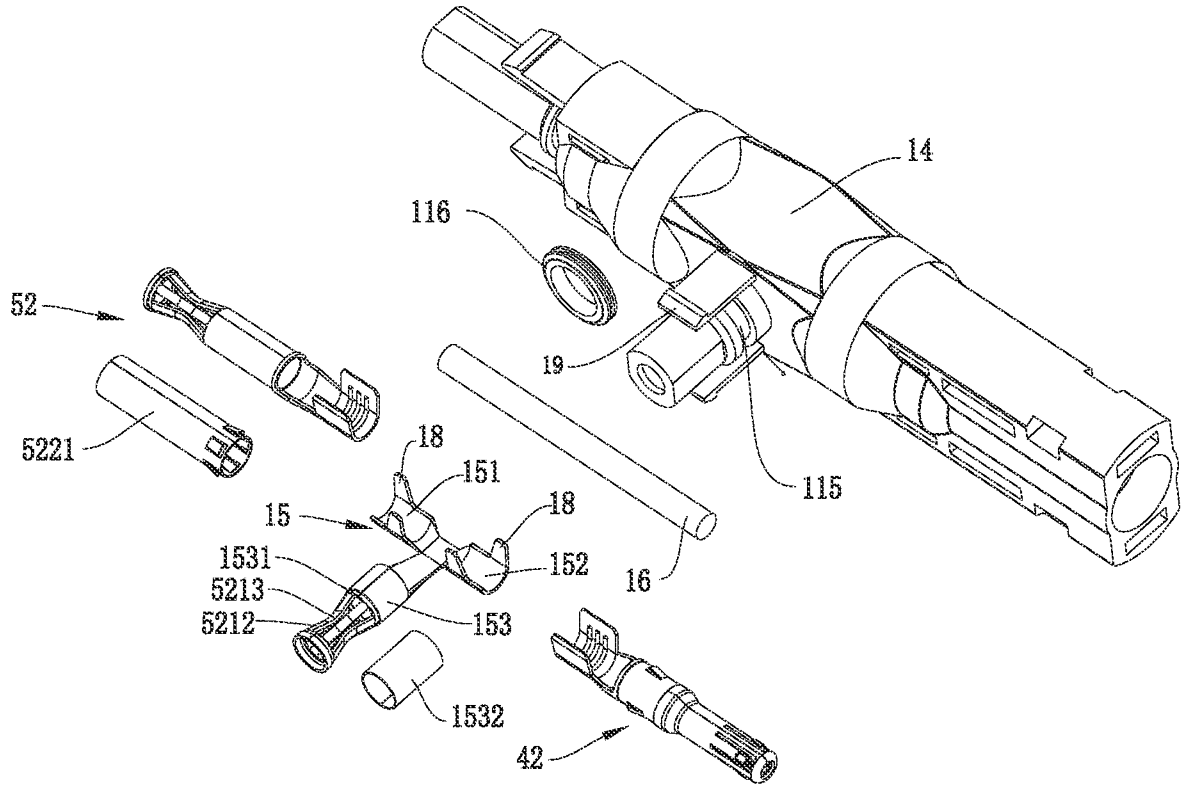
FIG. 5 is an exploded schematic diagram of a main connecting member according to the present disclosure.

As shown in FIG. 5, a female terminal 52 is provided inside the input connecting end 11; the female terminal 52 and the male terminal 42 are used in pairs, and the male terminal 42 is inserted into the female terminal 52 to be connected and transmit power or signals. Specifically, the female terminal 52 inside the input connecting end 11 is connected with the male terminal 42 of the last output port.

Figure 9:
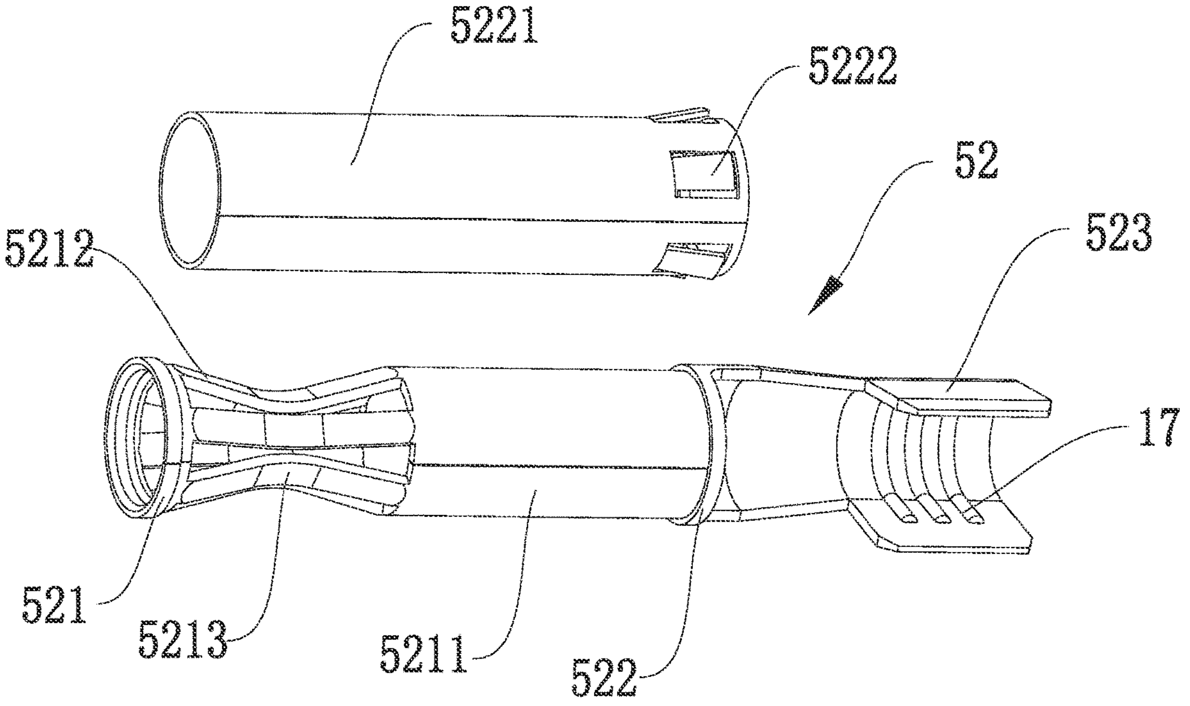
FIG. 9 is an exploded schematic diagram of a female terminal according to the present disclosure.

The structure of the female terminal 52 will be described in detail hereinafter with reference to FIG. 9. As shown in FIG. 9, the female terminal 52 comprises a first contact 521, a first base 522 and a first connecting member 523 which are connected in sequence from left to right. The first contact 521, the first base 522 and the first connecting member 523 are all made of metal materials, preferably copper materials with good conductivity. The first contact 521, the first base 522 and the first connecting member 523 are connected in sequence and integrally formed, and parts of the female terminal 52 are reduced, which is convenient for workers to install.

Similarly, in other embodiments, the second contact 421, the second base 422 and the second connecting member 423 can be manufactured separately, and then they can be fixedly connected together by welding or bolts.

As shown in FIG. 9, the first contact 521 is provided with a plurality of first elastic sheets 5212; one end of the first elastic sheet 5212 is connected with the end of the first contact 521, and the other end thereof is connected with the first base 522; further, an inward concave inner wall of the first elastic sheet 5212 forms an elastic contact area 5213, and the elastic contact area 5213 is a plane concave structure.

When the second contact 421 is inserted into the first contact 521, the inner side of the first elastic sheet 5212 is in close contact with the outer surface of the second elastic sheet 4212, and the elastic deformation force is used for pressing and close contact. Further, the convex body 4213 abuts against the inner wall on the right side of the elastic contact area 5213, which also makes the convex body 4213 cling to the inner wall of the elastic contact area 5213 by using elastic force.

As shown in FIG. 9, the first contact 521 and the first base 522 are further provided with first circular grooves 5211. A first clamping ring 5221 is sleeved on the first circular groove 5211. The outer surface of the first clamping ring 5221 is uniformly provided with first clamping members 5222 to be clamped inside a housing. The first clamping members 5222 and the second clamping members 4223 have the same functions. Specifically, the first clamping member 5222 can clamp the female terminal 52 inside the external housing (for example, the first housing 14, the second housing 24 or the third housing 34), which is convenient for workers to install.

Further, in this embodiment, one end of the first clamping member 5222 is connected with the outer surface of the first clamping ring 5221, and the cross-sectional area of the other end in the direction from the first clamping ring 5221 to the first connecting member 523 gradually increases. In other embodiments, one end of the first clamping member 5222 is connected with the outer surface of the first clamping ring 5221, and the end far away from the first clamping member 5222 slightly expands outward, which is not limited thereto. The direction in which the cross-sectional area increases and the direction in which the cross-sectional area slightly expands outward may be opposite to the above description, as long as the fixed function is realized.

As shown in FIG. 5, the main connecting member 1 comprises a first housing 14 provided outside, an upper end inside the first housing 14 is provided with a female terminal 52, a lower part thereof is provided with a male terminal 42, and a middle part thereof is provided with a first T-shaped connecting member 15. The female terminal 52, the male terminal 42 and the first T-shaped connecting member 15 are connected by a first copper rod 16. The female terminal 52, the male terminal 42 and the first T-shaped connecting member 15 can be connected through by first copper rod 16, so as to connect power and signals.

Further, the first T-shaped connecting member 15 is provided with an upper connecting end 151, a lower connecting end 152 and a transverse connecting end 153; an upper part of the first copper rod 16 is fixedly connected with the first connecting member 523, a lower part thereof is fixedly connected with the second connecting member 423, and a middle part thereof penetrates through the upper connecting end 151 and the lower connecting end 152; and the female terminal 52, the male terminal 42 and the first T-shaped connecting member 15 are tightly surrounded around the first copper rod 16 to realize electrical connection.

In order to further strengthen the connection between the male terminal 42, the female terminal 52 and the first copper rod 16, as shown in FIGS. 8 and 9, a plurality of ribs 17 for fixing the first copper rod 16 are provided inside the first connecting member 523 and the second connecting member 423; the plurality of ribs 17 are provided side by side, so that the friction force is increased, and the connection is more reliable and tight; the upper connecting end 151 and the lower connecting end 152 are both arc-shaped to tightly wrap the first copper rod 16; and the sides of the upper connecting end 151 and the lower connecting end 152 are provided with a plurality of circular arc sheets 18 for wrapping the first copper rod 16. The addition of a circular arc sheet 18 is beneficial to fixing the first copper rod 16, so that it is not easy for the first T-shaped connecting member 15 to deviate.

The transverse connecting end 153 can use the structure of the female terminal 52 or a structure similar to the female terminal 52. In this embodiment, the transverse connecting end 153 uses a structure similar to the female terminal 52. Specifically, the transverse connecting end 153 is provided with a third circular groove 1531, a plurality of first elastic sheets 5212 are provided in the third circular groove 1531; an inward concave inner wall of the first elastic sheet 5212 forms an elastic contact area 5213, the elastic contact area 5213 is a plane concave structure; and a third clamping ring 1532 is sleeved on the third circular groove 1531.

Specifically, as shown in FIG. 4, the transverse connecting end 153 is connected with the first circular plug 251, or the transverse connecting end 153 is connected with the male terminal 42; the elastic contact area 5213 in the transverse connecting end 153 squeezes the first circular plug 251, so that the first elastic sheet 5212 is in close contact with the first circular plug 251.

Figure 6:
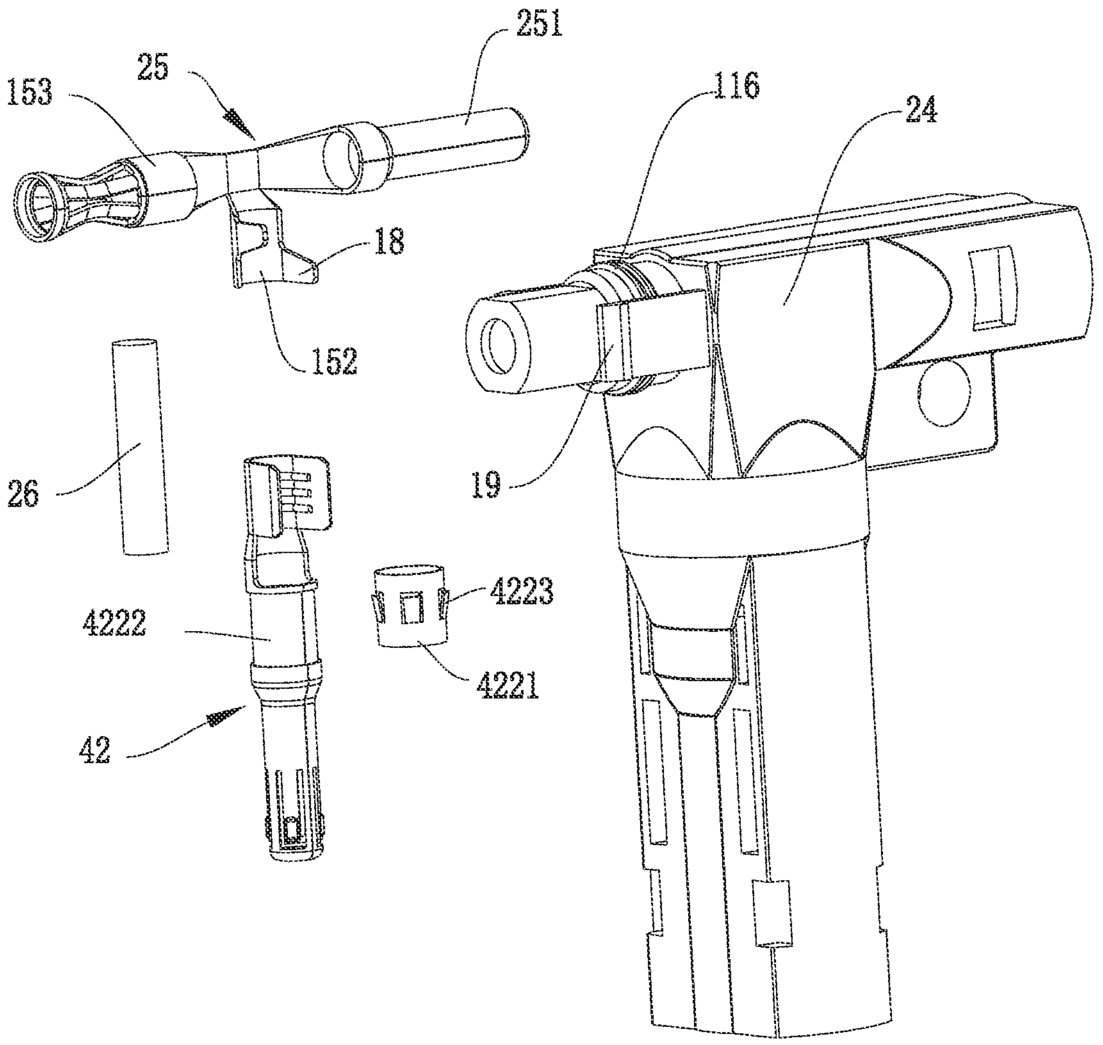
FIG. 6 is an exploded schematic diagram of an intermediate connecting member according to the present disclosure.

As shown in FIG. 6, the intermediate connecting member 2 comprises a second housing 24 provided outside. An upper end inside the second housing 24 is provided with a second T-shaped connecting member 25, and a lower part thereof is provided with a male terminal 42. The second T-shaped connecting member 25 and the male terminal 42 are connected by a second copper rod 26. One end of the second T-shaped connecting member 25 is provided with a first circular plug 251 to be inserted into the transverse connecting end 153, the other end thereof is provided with the transverse connecting end 153, and a lower end thereof is provided with a lower connecting end 152. An upper part of the second copper rod 26 is fixedly connected with the lower connecting end 152, and the lower part thereof is connected with the second connecting member 423.

The intermediate connecting member 2 serves as a connecting bridge. The first circular plug 251 is inserted into the transverse connecting end 153 as input. The transverse connecting end 153 serves as side output, and the lower connecting end 152 serves as lower output. When a plurality of intermediate connecting members 2 are connected, the first circular plug 251 of one intermediate connecting member 2 is inserted into the transverse connecting end 153 of another intermediate connecting member 2, thus realizing transverse splicing and adding a plurality of second output connecting ends 23.

Figure 7:
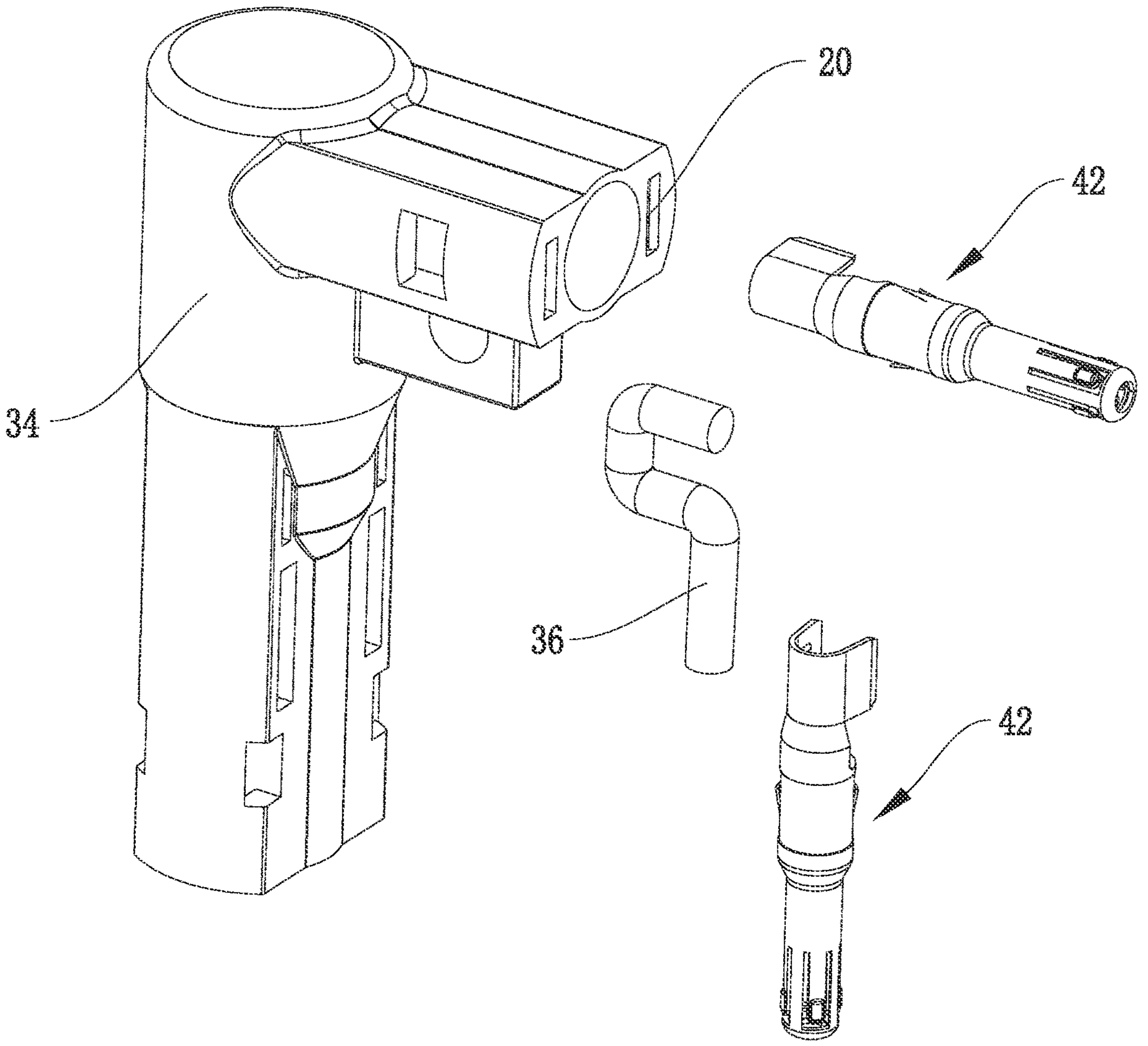
FIG. 7 is an exploded schematic diagram of a rear connecting member according to the present disclosure.

As shown in FIG. 7, the rear connecting member 3 comprises a third housing 34 provided outside. A side end inside the third housing 34 is provided with a male terminal 42 to be inserted into the transverse connecting end 153, and a lower part thereof is further provided with a male terminal 42. One of the male terminals 42 is inserted into the transverse connecting end 153 of the intermediate connecting member 2 to realize the input of power and signals, and the other male terminal 42 is used as an output. Further, the two male terminals 42 are connected by a third copper rod 36. The third copper rod 36 can be L-shaped. Both ends of the third copper rod 36 is fixedly connected with the second connecting member 423. In order to be more compact, in this embodiment, the shape of the third copper rod 36 is adaptively changed, so that the third copper rod 36 and the third output connecting end 32 can be closer to the second output connecting end 23.

As shown in FIG. 5, both the first transverse output end 13 and the second transverse output end 22 are provided with waterproof grooves 115, and an annular waterproof ring 116 is sleeved on the waterproof groove 115. Preferably, the annular waterproof ring 116 has a double-peak structure. In this way, the combined connectors have good waterproof performance.

Hooks 19 are provided on both sides of the first transverse output end 13 and the second transverse output end 22. The cross section of the hooks 19 is conical. Two symmetrical clamping grooves 20 are provided on both sides of the first transverse input end 21 and the second transverse input end 31, The size of the clamping groove 20 is matched with the size of the hook 19.

By designing the hooks 19 to be tapered in cross section, two hooks 19 get close to each other due to being squeezed by the inner wall when passing through the second housing 24 and the third housing 34. When passing through the clamping groove 20, the hooks 19 are exposed. At this time, the hooks 19 are clamped in the clamping groove 20, and the side walls are fastened, so that the first housing 14 and the second housing 24 (or the second housing 24 and the third housing 34) are fixedly connected.

The use method of the multi-channel transverse combined connector is as follows. First, the number of the required output ends is selected, so as to select the number of intermediate connecting members 2. Second, a plurality of intermediate connecting members 2 are transversely spliced together, wherein the first circular plug 251 of one intermediate connecting member 2 is inserted into the transverse connecting end 153 of the previous intermediate connecting member 2, and the hook 19 and the clamping groove 20 are also mutually buckled. Finally, the first circular plug 251 of the intermediate connecting member 2 is inserted into the transverse connecting end 153 of the main connecting member 1, and the transverse connecting end 153 of the last intermediate connecting member 2 is inserted into the transverse male terminal 42 of the rear connecting member 3, so as to realize the transverse expansion of the connector. The internal part uses the plug-in mode, and the external part uses the manner in which the hook 19 and the clamping groove 20 are mutually buckled, so as to realize the internal connection of the connector and improve the integration degree of the connector. The connector of the present disclosure can be transversely expanded only by adding an intermediate connecting member 2 between the main connecting member 1 and the rear connecting member 3, so that the connection cost is greatly reduced, thereby being beneficial to large-scale application.

The above-mentioned embodiment is the preferred embodiment of the present disclosure, but the embodiment of the present disclosure is not limited by the above-mentioned embodiment. Any other changes, modifications, substitutions, combinations and simplifications made without departing from the spirit and principle of the present disclosure shall be equivalent replacements, which are all included in the scope of protection of the present disclosure.

What is claimed is:

1. A multi-channel transverse combined connector for photovoltaic use, comprising: a main connecting member provided on one side, a rear connecting member provided on the other side, and a plurality of intermediate connecting members provided in a middle;

wherein an upper end of the main connecting member is provided with an input connecting end for connecting input, a lower end thereof is provided with a first output connecting end for outputting, and a side end thereof is provided with a first transverse output end for outputting;

one side of the intermediate connecting members is provided with a first transverse input end for connecting the first transverse output end, the other side thereof is provided with a second transverse output end for outputting, and a lower end thereof is provided with a second output connecting end for outputting;

a side end of the rear connecting member is provided with a second transverse input end for connecting the second transverse output end, and a lower end thereof is provided with a third output connecting end for outputting;

wherein male terminals are provided inside the first output connecting end, the second output connecting end, the third output connecting end and the second transverse input end; the male terminals comprise a second contact, a second base and a second connecting member connected in sequence; the second contact is provided with a second circular plug at one end far away from the second base; the second circular plug is provided with a plurality of second elastic sheets which are in close contact with an inserted part, and an end of the second elastic sheets is further provided with at least one convex body.

2. The multi-channel transverse combined connector for photovoltaic use according to claim 1, wherein a second clamping ring is provided on the second base, a second circular groove is provided on the second base, the second clamping ring is sleeved inside the second circular groove, and an outer surface of the second clamping ring is provided with second clamping members to be clamped inside a housing.

3. The multi-channel transverse combined connector for photovoltaic use according to claim 2, wherein one end of the second clamping members is connected with the outer surface of the second clamping ring, and a cross-sectional area of the other end in a direction from the second clamping ring to the second connecting member is gradually increased.

4. The multi-channel transverse combined connector for photovoltaic use according to claim 1, wherein female terminals are provided inside the input connecting end; the female terminals and the male terminals are used in pairs, the male terminals are inserted into the female terminals;

the female terminals comprise a first contact, a first base and a first connecting member; and the first contact, the first base and the first connecting member are connected in sequence.

5. The multi-channel transverse combined connector for photovoltaic use according to claim 4, wherein the first contact is provided with a plurality of first elastic sheets;

one end of the first elastic sheets is connected to one end of the first contact, and the other end thereof is connected with the first base, an inward concave inner wall of the first elastic sheets forms an elastic contact area, and the elastic contact area is a plane concave structure.

6. The multi-channel transverse combined connector for photovoltaic use according to claim 5, wherein the first contact and the first base are further provided with first circular grooves, a first clamping ring is sleeved on the first circular grooves, and an outer surface of the first clamping ring is provided with first clamping members to be clamped inside a housing.

7. The multi-channel transverse combined connector for photovoltaic use according to claim 6, wherein one end of the first clamping members is connected with the outer surface of the first clamping ring, and a cross-sectional area of the other end in a direction from the first clamping ring to the first connecting member gradually increases.

8. The multi-channel transverse combined connector for photovoltaic use according to claim 4, wherein the main connecting member comprises a first housing provided outside, an upper end inside the first housing is provided with the female terminals, a lower part thereof is provided with the male terminals, and a middle part thereof is provided with a first T-shaped connecting member, the female terminals, the male terminals and the first T-shaped connecting member are connected by a first copper rod, the first T-shaped connecting member is provided with an upper connecting end, a lower connecting end and a transverse connecting end;

an upper part of the first copper rod is fixedly connected with the first connecting member, a lower part thereof is fixedly connected with the second connecting member, and a middle part thereof penetrates through the upper connecting end and the lower connecting end.

9. The multi-channel transverse combined connector for photovoltaic use according to claim 8, wherein a plurality of ribs for fixing the first copper rod are provided inside the first connecting member and the second connecting member;

the upper connecting end and the lower connecting end are both arc-shaped to tightly wrap the first copper rod; and sides of the upper connecting end and the lower connecting end are provided with a plurality of circular arc sheets for wrapping the first copper rod.

10. The multi-channel transverse combined connector for photovoltaic use according to claim 8, wherein the transverse connecting end is provided with a third circular groove, a plurality of first elastic sheets are provided in the third circular groove;

an inward concave inner wall of the first elastic sheets forms an elastic contact area, the elastic contact area is a plane concave structure; and a third clamping ring is sleeved on the third circular groove.

11. The multi-channel transverse combined connector for photovoltaic use according to claim 8, wherein the intermediate connecting members comprise a second housing provided outside, an upper end inside the second housing is provided with a second T-shaped connecting member, a lower part thereof is provided with the male terminals, the second T-shaped connecting member and the male terminals are connected by a second copper rod, one end of the second T-shaped connecting member is provided with a first circular plug to be inserted into the transverse connecting end, the other end thereof is provided with the transverse connecting end, a lower end thereof is provided with the lower connecting end, an upper part of the second copper rod is fixedly connected with the lower connecting end, and the lower part thereof is connected with the second connecting member.

12. The multi-channel transverse combined connector for photovoltaic use according to claim 11, wherein the rear connecting member comprises a third housing provided outside, a side end inside the third housing is provided with the male terminals to be inserted into the transverse connecting end, a lower part thereof is further provided with the male terminals, the male terminals are connected by a third copper rod, and both ends of the third copper rod are fixedly connected with the second connecting member.

13. The multi-channel transverse combined connector for photovoltaic use according to claim 1, wherein both the first transverse output end and the second transverse output end are provided with waterproof grooves, an annular waterproof ring is sleeved on the waterproof grooves;

the annular waterproof ring has a double-peak structure; hooks are provided on both sides of the first transverse output end and the second transverse output end, a cross section of the hooks is conical, two symmetrical clamping grooves are provided on both sides of the first transverse input end and the second transverse input end, and sizes of the clamping grooves are matched with sizes of the hooks.

14. The multi-channel transverse combined connector for photovoltaic use according to claim 1, wherein the second contact, the second base and the second connecting member are integrally formed.

* * * * *